No. 681,823. Patented Sept. 3, 1901.
J. W. ATKINS.
KITCHEN CABINET.
(Application filed July 6, 1900.)
(No Model.)
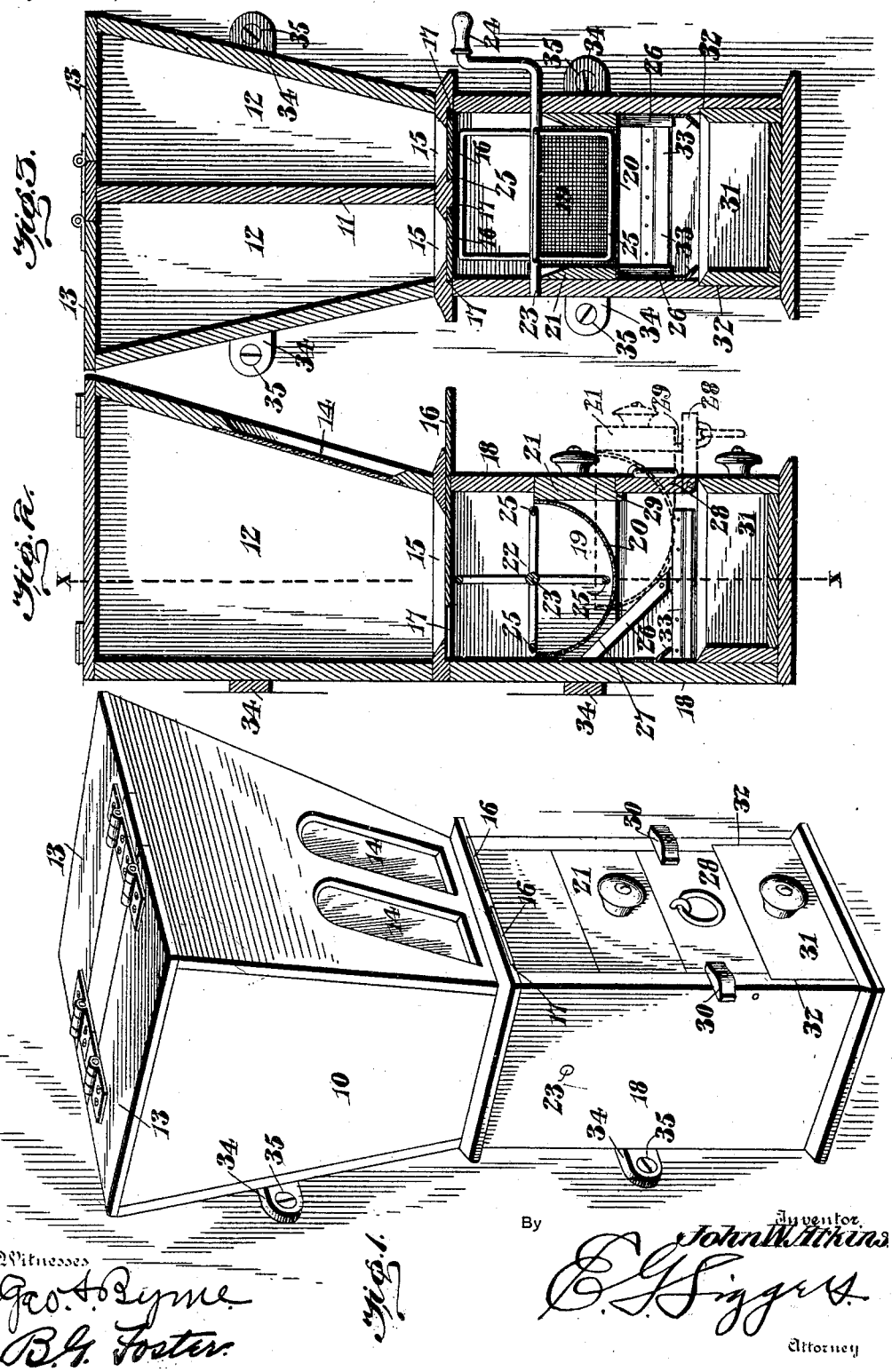

UNITED STATES PATENT OFFICE.

JOHN WILLIAM ATKINS, OF REDLAND, INDIAN TERRITORY, ASSIGNOR OF ONE-HALF TO WILLIAM T. HENRY, OF SAME PLACE.

KITCHEN-CABINET.

SPECIFICATION forming part of Letters Patent No. 681,823, dated September 3, 1901.

Application filed July 6, 1900. Serial No. 22,704. (No model.)

*To all whom it may concern:*

Be it known that I, JOHN WILLIAM ATKINS, a citizen of the United States, residing at Redland, in the Cherokee Nation, Indian Territory, have invented a new and useful Kitchen-Cabinet, of which the following is a specification.

This invention relates to improvements in kitchen-cabinets, and the object thereof is the provision of a combined bin and sieve, said bin being provided with several compartments adapted to hold different kinds of ground material, such as flour and meal, and having means whereby the material from any compartment desired may be passed through the sieve.

A further object is to provide means whereby the sieve may be easily removed and replaced for the purpose of cleaning or changing the same and without the necessity of disturbing any of the other elements of the cabinet.

In order that the invention may be fully understood, the preferred form thereof is described in the appended specification, reference being had to the drawings which accompany the same, and in which—

Figure 1 is a perspective view of the preferred form of cabinet. Fig. 2 is a vertical longitudinal section of the same. Fig. 3 is a vertical longitudinal section taken on the line $x$ $x$ of Fig. 2.

Similar reference-numerals designate corresponding parts in each of the figures of the drawings.

The bin proper is designated by the reference-numeral 10, and, as shown, is preferably hopper-shaped and divided by the vertical partition 11 into two compartments 12, each of which is provided with hinged-top closures 13. In the front of each compartment is a sight-opening 14, by means of which the quantity of material contained within the same may be readily ascertained. The bottom of each compartment has an opening 15 through the same, and these openings are covered and uncovered by the cut-off slides 16, which are provided with beveled edges and slide in dovetailed grooves 17, arranged in the under face of the bottom. The ends of these slides extend through the walls of the casing, whereby they may be drawn out, as shown in Fig. 2, to allow the material to pass through.

Suspended from the bin 10 is a casing 18, within which is detachably secured a sieve 19. This sieve comprises a semicylindrical screen 20, forming the bottom of a drawer 21, which is slidably arranged within the casing. Working across the upper face of the screen 20 is the rotary stirrer 22. This stirrer comprises a shaft 23, mounted transversely across the casing 18, one end of said shaft projecting through the same and provided with an exterior operating-handle 24. Secured to the shaft are a plurality of stirrer-arms 25, that are arranged to work across the entire upper surface of the screen 20.

The interior side walls of the casing are provided with the opposite inclined guide-cleats 26, and the inner ends of the side walls of the drawer are cut away or chamfered, as at 27, to slidably fit these guide-cleats, whereby the screen 20 will be brought into close contact with the stirrer-arms 25 when in place, as shown in Fig. 2. In order to hold the front end of the drawer 21 in position, the pivoted drop-door 28 is provided, upon which when it is in closed position the front end of the drawer 21 rests, said drawer being provided with the depending flange 29, that forms a stop, against which the top edge of said door abuts. Turn-buttons 30 secure the door in operative position, in which position it closes the opening in the front of the casing and forms a false-drawer front.

Arranged in the lower part of the casing 18 is the receiving-drawer 31, which receives the material after passing through the sieve. The casing is provided on opposite sides with offset grooves 32, in which this drawer 31 slides, and the inclined guards 33, arranged upon the walls of the casing above the drawer, direct the material into the same. In order to secure the device to a wall or other suitable support, the transverse supporting-bars 34 are secured to the back of the same and project beyond the side walls thereof, and these bars are provided with openings 35, through which securing-screws may be passed.

In using the device different kinds of material are placed in the different compartments—for instance, flour and meal. When a supply of either kind is desired, the slide 16 of the compartment containing it is drawn out until a sufficient amount has been delivered into the sieve. The stirrer is then rotated and the material drops into the drawer 31, from whence it can be easily removed. When it is desired to remove the sieve for cleaning or in order to replace it by a coarser or finer one, as is sometimes desired, the door 28 is dropped down, and the sieve will then drop by gravity from beneath the stirrer and can be easily removed from the casing.

From the foregoing it is thought that the construction, operation, and many advantages of the herein-described invention will be apparent to those skilled in the art without further description, and it will be understood that changes in the size, shape, proportion, and minor details of construction may be resorted to without departing from the spirit or sacrificing any of the advantages of the invention.

Having thus described the invention, what I claim as new, and desire to secure by Letters Patent, is—

1. In a kitchen-cabinet, a casing, a drawer arranged within said casing and carrying a sieve, a rotatable stirrer mounted within the casing and coöperating with said sieve, and means for supporting said drawer and the sieve carried thereby in coöperative relation with the stirrer, said means including a drop-door pivotally mounted upon the casing and arranged to engage a portion of the drawer to hold the same in said coöperative relation.

2. A kitchen-cabinet comprising a bin, a casing arranged beneath and having a communication with said bin, a sieve slidably mounted in the casing, a rotatable stirrer also mounted in the casing and coöperating with the sieve, means arranged within the casing for supporting the rear end of said sieve, and a drop-door pivotally mounted upon the casing and adapted to support the front portion thereof, whereby said sieve is held in coöperating relation with the stirrer, and a drawer arranged in said casing beneath the sieve.

3. In a kitchen-cabinet, the combination with a bin, of a casing arranged beneath said bin and having an opening in one side thereof, a stirrer rotatably mounted in the casing, a sieve detachably mounted in the casing beneath the stirrer and removable through the side opening, the front portion of said sieve when in place closing a portion of said opening, and means for supporting said sieve, said means including a door pivotally mounted upon the casing and forming a front support for said sieve, said door also forming a closure for the side opening of the casing beneath the sieve.

4. In a kitchen-cabinet, the combination with a bin, of a casing arranged beneath said bin and having an opening in one side thereof, said casing being also provided with inclined guide-cleats upon its opposite inner walls adjacent to the side opening, a stirrer rotatably mounted in the casing, a sieve slidably mounted in the casing upon the inclined guide-cleats, and beneath the stirrer, the front portion of said sieve when in place closing a portion of the side opening, and a door pivotally mounted upon the casing and forming a support for said sieve when in place, said door also forming a closure for the side opening of the casing beneath the sieve.

In testimony that I claim the foregoing as my own I have hereto affixed my signature in the presence of two witnesses.

JOHN WILLIAM ATKINS.

Witnesses:
    B. H. CRAVENS,
    FOREST ALLAM.